United States Patent
Huang (10) Patent No.: US 11,537,768 B2
(45) Date of Patent: Dec. 27, 2022

(54) METHOD FOR AGING SIMULATION MODEL ESTABLISHMENT

(71) Applicant: NANYA TECHNOLOGY CORPORATION, New Taipei (TW)

(72) Inventor: Jei-Cheng Huang, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 222 days.

(21) Appl. No.: 16/820,685

(22) Filed: Mar. 16, 2020

(65) Prior Publication Data

US 2021/0286918 A1    Sep. 16, 2021

(51) Int. Cl.
*G06F 30/20* (2020.01)
*G06F 119/04* (2020.01)

(52) U.S. Cl.
CPC .......... *G06F 30/20* (2020.01); *G06F 2119/04* (2020.01)

(58) Field of Classification Search
CPC .............................. G06F 30/20; G06F 2119/04
USPC ...................................................... 703/13, 14
See application file for complete search history.

(56) References Cited

U.S. PATENT DOCUMENTS

| | | | |
|---|---|---|---|
| 5,508,632 A | 4/1996 | Shimizu et al. | |
| 7,567,891 B1* | 7/2009 | Liu | ........................ G06F 30/367 703/13 |
| 8,099,269 B2 | 1/2012 | Topaloglu et al. | |
| 8,370,774 B2 | 2/2013 | Tsai et al. | |
| 8,756,559 B2 | 6/2014 | Shroff et al. | |
| 2008/0116455 A1* | 5/2008 | Jain | ........................ H03L 1/00 257/48 |
| 2009/0299716 A1 | 12/2009 | Liu et al. | |
| 2010/0257493 A1* | 10/2010 | Agarwal | ............... G06F 30/367 716/136 |
| 2014/0106481 A1* | 4/2014 | Lee | .................... G01R 31/2642 438/17 |

OTHER PUBLICATIONS

F. Cacho et al., "HCI/BTI Coupled Model: The Path for Accurate and Predictive Reliability Simulations," 2014 IEEE International Reliability Physics Symposium, 5 pages.

(Continued)

*Primary Examiner* — Andre Pierre Louis
(74) *Attorney, Agent, or Firm* — CKC & Partners Co., LLC (57) ABSTRACT

A method for aging simulation model establishment includes following operations. Provide a planar p-type metal-oxide-semiconductor field-effect transistor (pMOSFET) having a source and a drain. Measure a first reliability degradation data of the pMOSFET. Select a model for the pMOSFET with modeling parameters related to hot carrier induced punch-through (HEIP). The modeling parameters comprise hot carrier injection (HCI) parameters used to fix a simulated current relation between the source and the drain. Construct the modeling parameters by aging parameters multiplied corresponding flags. Perform a simulation of the pMOSFET with the model to have a second reliability degradation data. Update the aging parameters and re-performing the simulation if the first reliability degradation data and second reliability degradation data are not matched. Collect the aging parameters when the first reliability degradation data and the second reliability degradation data are matched to establish the aging simulation model for the pMOSFET.

14 Claims, 6 Drawing Sheets

(56) References Cited

OTHER PUBLICATIONS

K. H. Kwak et al., "Suppression of Hot-Electron-Induced Punchthrough on Buried-Channel pMOSFETs with 0.15-µm Gate Lengths," Journal of the Korean Physical Society, vol. 44, No. 1, Jan. 2004, pp. 103-107.

\* cited by examiner

METHOD FOR AGING SIMULATION MODEL ESTABLISHMENT

BACKGROUND

Field of Invention

The present disclosure relates to methods for aging simulation model establishment, and those aging models are used to simulate the MOSFETs with short channel lengths.

Description of Related Art

In the design of integrated circuits, designers need to simulate the performance of the designed integrated circuits, and the designers can have simulated electron properties to predict the true performances of the designed integrated circuits. For example, the aging performance is an important issue for the integrated circuit simulation.

In conventional simulations for metal-oxide-semiconductor field-effect transistors (pMOSFETs), the negative bias temperature instability (NBTI) and the hot carrier injection (HCI) are considered to predict the aging performance. However, for a p-type MOSFET (pMOSFET) having a short channel length, hot electron induced punch-through (HEIP) phenomenon causes unexpected electric properties beyond the NBTI and the HCI consideration in conventional simulations.

Accordingly, how to improve the conventional simulation method to have a simulation result that matches the measurement of a short channel pMOSFET is a subject solved by those in the industry.

SUMMARY

To achieve the above object, one aspect of the present disclosure is relative to methods for aging simulation model establishment in semiconductor integrated circuit.

One aspect of the present disclosure is a method for aging simulation model establishment.

According to one embodiment of the present disclosure, the method for establishing an aging simulation model includes following operations. Provide a planar p-type metal-oxide-semiconductor field-effect transistor (pMOSFET) having a source and a drain. Measure a first reliability degradation data of the pMOSFET. Select a model for the pMOSFET with modeling parameters related to hot carrier induced punch-through (HEIP). The modeling parameters comprise hot carrier injection (HCI) parameters used to fix a simulated current relation between the source and the drain. Construct the modeling parameters by aging parameters multiplied corresponding flags. Perform a simulation of the pMOSFET with the model to have a second reliability degradation data. Update the aging parameters and re-performing the simulation if the first reliability degradation data and second reliability degradation data are not matched. Collect the aging parameters when the first reliability degradation data and the second reliability degradation data are matched to establish the aging simulation model for the pMOSFET.

In one or more embodiments of the present disclosure, the pMOSFET has an effective channel length less than 100 nm.

In one or more embodiments of the present disclosure, the pMOSFET is surrounded by a shallow trench isolation with a liner nitride.

In one or more embodiments of the present disclosure, the operation of measuring the first reliability degradation data of the pMOSFET further includes following operation. Measure current from the source to the drain of the pMOSFET. A relation about the measured current over time is the first reliability degradation data. A voltage between the source and the drain is greater than a voltage between the source and a gate of the pMOSFET.

In one or more embodiments of the present disclosure, the selected model comprises a MOS modeling and reliability analysis solution (MOSRA) model.

In one or more embodiments, the HCI parameters are respectively associated with a temperature, driving voltages, and the effective channel length of the pMOSFET.

In one or more embodiments of the present disclosure, each flag is one or zero, and the flags are configured to perform on/off functions logically.

Another aspect of the present disclosure is a method for aging simulation model establishment.

According to one embodiment of the present disclosure, the method for aging simulation model establishment includes following operations. Provide a planar p-type metal-oxide-semiconductor field-effect transistor (pMOSFET) having a source and a drain. Measure a first reliability degradation data of the pMOSFET. Select a model for the pMOSFET with modeling parameters added for degradation. Perform a simulation of the pMOSFET with the model to have a simulated reliability degradation data. Construct a fitting function with aging parameters related to hot carrier induced punch-through (HEIP). The aging parameters are used to fix a simulated current relation between the source and the drain. Construct a second reliability degradation data by the simulated reliability degradation data and the fitting function. Update the aging parameters and re-calculating the fitting function to have an improved second reliability degradation data if the first reliability degradation data and second reliability degradation data are not matched. Collect the fitting function and the aging parameters when the first reliability degradation data and the second reliability degradation data are matched to establish the aging simulation model for the pMOSFET.

In one or more embodiments of the present disclosure, the pMOSFET has an effective channel length less than 100 nm.

In one or more embodiments of the present disclosure, the pMOSFET is surrounded by a shallow trench isolation with a liner nitride.

In one or more embodiments of the present disclosure, the operation of measuring the first reliability degradation data of the pMOSFET further includes following operation. Measure current from the source to the drain of the pMOSFET. A relation about the measured current over time is the first reliability degradation data.

In one or more embodiments of the present disclosure, the selected model comprises a Berkeley short-channel IGFET 4 (BSIM4) model.

In one or more embodiments of the present disclosure, the operation of performing the simulation of the pMOSFET with the model to have the simulated reliability degradation data further includes following operation. Set up degradation periods for the simulation.

In one or more embodiments of the present disclosure, the aging parameters are respectively associated with a temperature, driving voltages, and the effective channel length of the pMOSFET.

In summary, for two methods for establishing aging simulation models of the present disclosure, the HEIP phenomenon in short channel pMOSFET is considered, the simulation can be performed under the conventional simulation models, and the simulation result can be compared with the measurement.

It is to be understood that both the foregoing general description and the following detailed description are by examples, and are intended to provide further explanation of the disclosure as claimed.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the disclosure.

DETAILED DESCRIPTION

Reference will now be made in detail to the embodiments of the present disclosure, examples of which are illustrated in the accompanying drawings. Wherever possible, the same reference numbers are used in the drawings and the description to refer to the same or like parts.

In addition, terms used in the specification and the claims generally have the usual meaning as each terms are used in the field, in the context of the disclosure and in the context of the particular content unless particularly specified. Some terms used to describe the disclosure are to be discussed below or elsewhere in the specification to provide additional guidance related to the description of the disclosure to specialists in the art.

Phrases "first," "second," etc., are solely used to separate the descriptions of elements or operations with same technical terms, not intended to be the meaning of order or to limit the disclosure.

Secondly, phrases "comprising," "includes," "provided," and the like, used in the context are all open-ended terms, i.e. including but not limited to.

Further, in the context, "a" and "the" can be generally referred to one or more unless the context particularly requires. It will be further understood that phrases "comprising," "includes," "provided," and the like, used in the context indicate the characterization, region, integer, step, operation, element and/or component it stated, but not exclude descriptions it stated or additional one or more other characterizations, regions, integers, steps, operations, elements, components and/or groups thereof.

Figure 1:
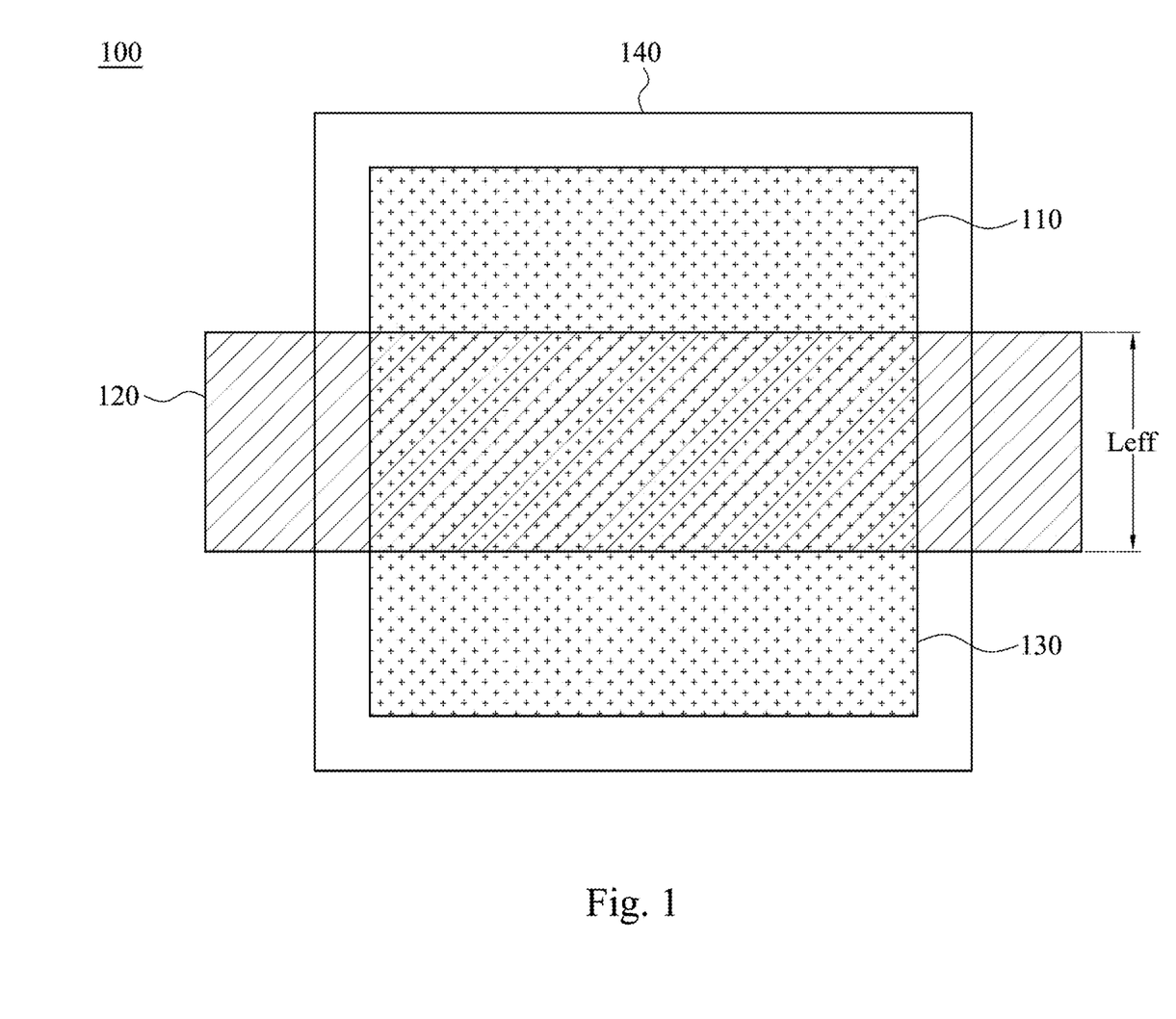
FIG. 1 is a schematic top view of a short channel pMOSFET according to one embodiment of the present disclosure.

FIG. 1 is a schematic top view of a short channel pMOSFET 100 according to one embodiment of the present disclosure. In this embodiment, the pMOSFET 100 is a planar pMOSFET. In some embodiments, the pMOSFET 100 is a part of a planar CMOS.

In this embodiment, the pMOSFET 100 is a silicon pMOSFET but not limited to the present disclosure.

As shown in FIG. 1, the planar pMOSFET 100 includes a source terminal 110, a gate terminal 120 and a drain terminal 130. The gate terminal 120 is located on a channel portion between the source terminal 110 and the drain terminal. The gate terminal 120 has a channel length Leff.

In this embodiment, the planar pMOSFET 100 further includes a shallow trench isolation (STI) 140. As shown in FIG. 1, the shallow trench isolation surrounds the pMOSFET 100. Specifically, the shallow trench isolation 140 surrounds the source terminal 110, the drain terminal 130 and the channel portion between the source terminal 110 and the drain terminal 130. The shallow trench isolation 140 is used to isolate the pMOSFET and other devices.

For pMOSFET, the major carrier is electric holes. An electric hole is a lack of an electron at a position in semiconductor. For a pMOSFET, a lack can be form not only within the pMOSFET 100 but also at the interface between the pMOSFET 100 and the shallow trench isolation 140 and at the interface between the channel portion and the gate terminal 120.

In this embodiment, the pMOSFET has a channel length Leff of the channel portion less than 100 nm. Therefore, the height difference between the pMOSFET 100 and the shallow trench isolation 140 and the height difference between the channel portion and the gate terminal 120 are quite reasons to form vacancies. Effectively, the electric holes of the pMOSFET 100 can be trapped by lacks at the interface of the shallow trench isolation 140 or the oxide near the drain terminal, which is at the interface between the channel portion and the gate terminal 120. It causes the unexpected electric properties beyond the conventional simulation for a short channel pMOSFET 100. The unexpected electric properties of the electric holes of the short channel pMOSFET 100 is known as hot electron induced punch-through (HEIP), and it causes that the current from the source terminal 110 to the drain terminal 130 increases first then decreases.

Figure 2:
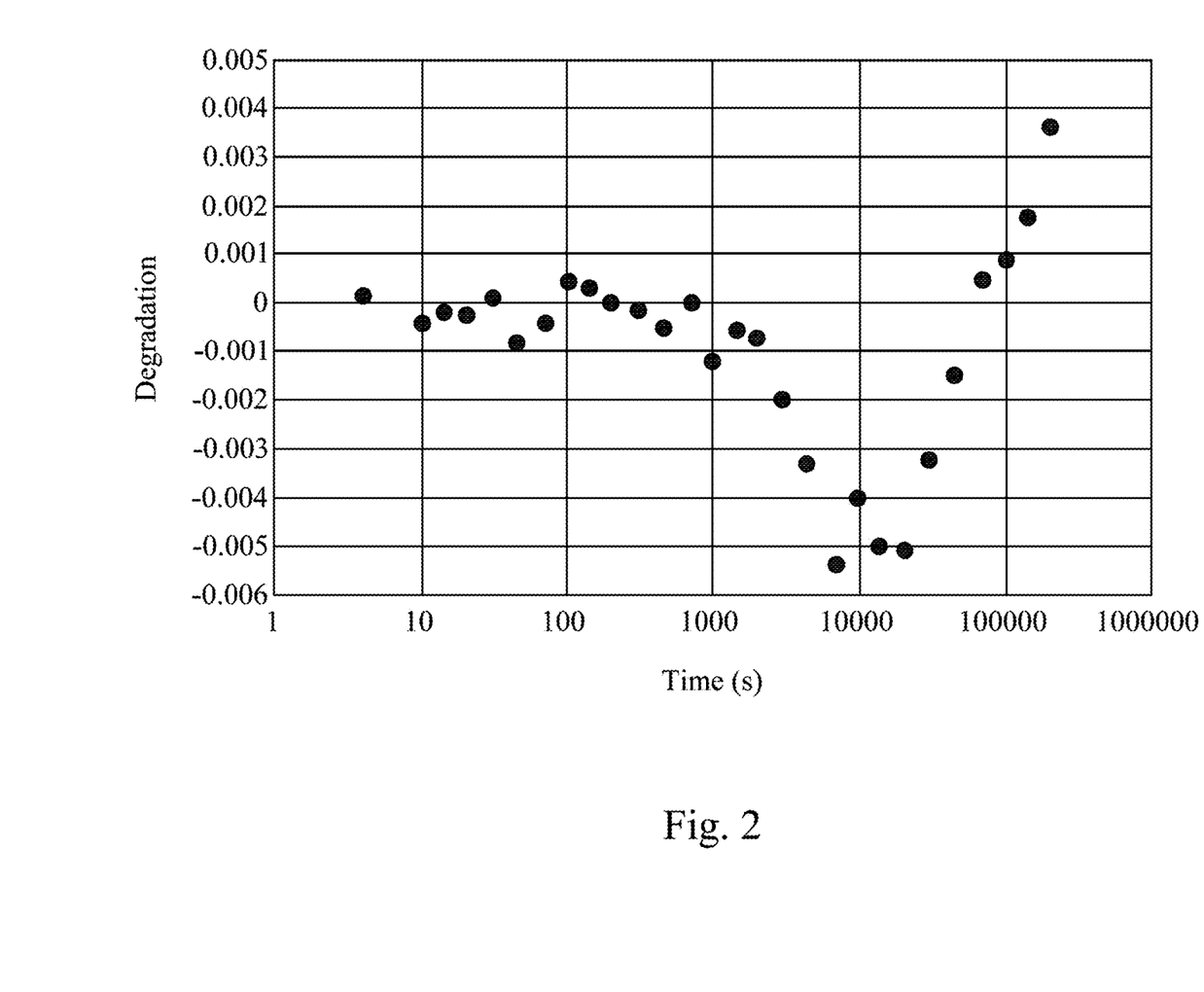
FIG. 2 is a degradation performance measured by the short channel pMOSFET of FIG. 1.

FIG. 2 is a degradation performance measured by the short channel pMOSFET 100 of FIG. 1. The degradation performance is measured by a reliability test.

To have the electric properties of the short channel pMOSFET 100, a reliability test is required to understand that how the pMOSFET 100 ages when the pMOSFET 100 operates. In this embodiment, a voltage between the source terminal 110 and the drain terminal 130 is greater than a voltage between the source terminal and a gate terminal 120 of the pMOSFET 100, and horizontal electric field from the source terminal 110 to the drain terminal 130 is greater than the vertical electrical field from the gate terminal 120 to the source terminal 110. Therefore, current flows from the source terminal 110 to the drain terminal 130. For the pMOSFET 100, the current flow caused by the movements of the electric holes.

The electric holes from the source terminal 110 to the drain terminal 130 may damage the pMOSFET 100, and the degradation performance illustrates the current changing caused by the damage. For example, in this embodiment, the electric holes can be trapped and accumulated at the interface of the shallow trench isolation 140 and at the oxide of the gate terminal 120 near the drain terminal 130 since the pMOSFET 100 is a short channel pMOSFET. The accumulation of the electric holes damages the interface of the drain terminal 130, thereby the current flowing to the drain terminal 130 changes.

In FIG. 2, the horizontal axis is related to the stress time, and the vertical axis is about the degradation of the current from the source terminal 110 to drain terminal 130. When the reliability test begins, the term "0" of the vertical axis is defined by the initial current, and the degradation of FIG. 2 means the current changing ratio with respect to the initial current. As shown in FIG. 2, the current from the source terminal 110 to the drain terminal 130 increases first then decreases.

Figure 3:
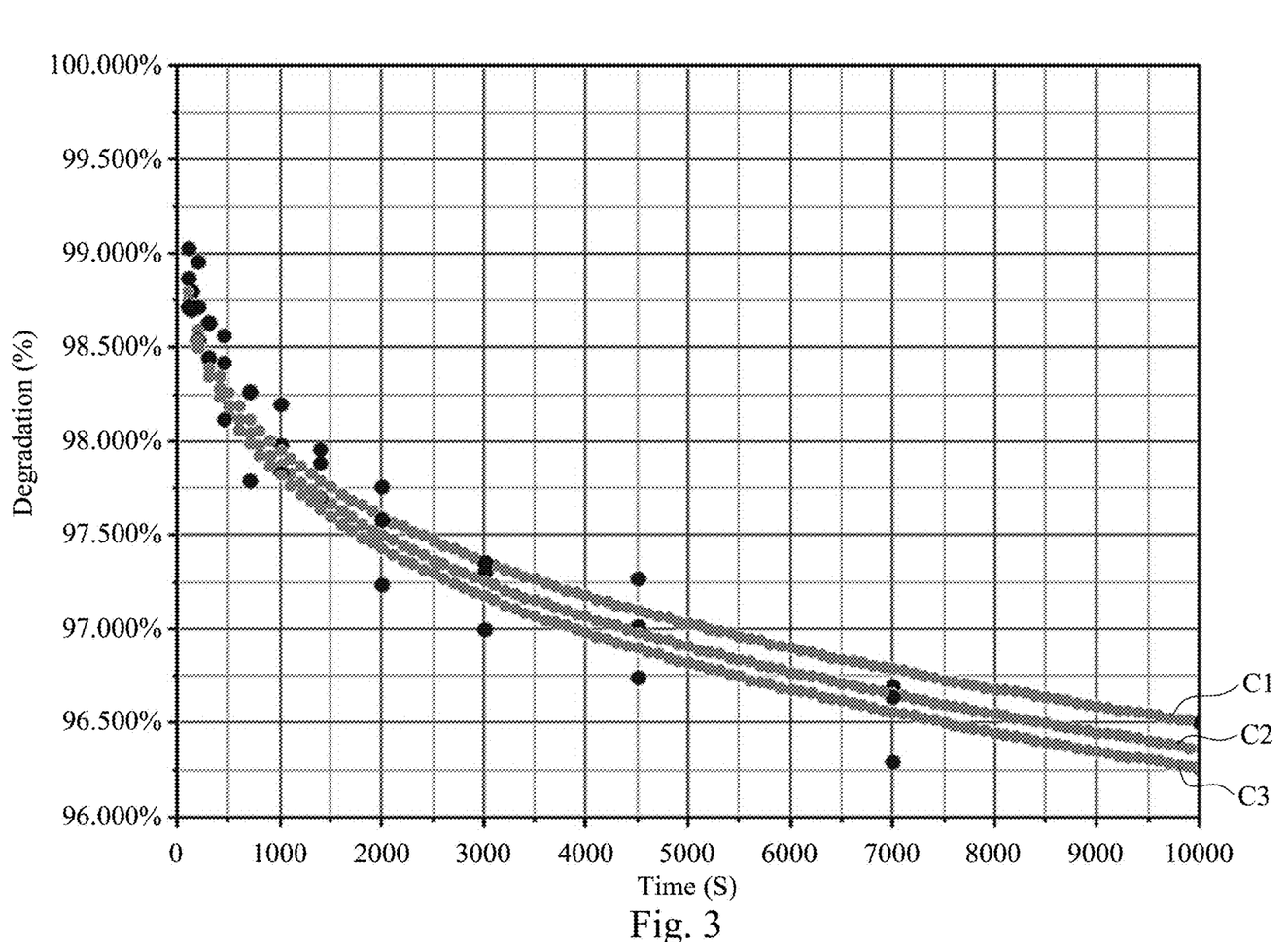
FIG. 3 illustrates simulated degradation performances and corresponding fitting points of the short channel pMOSFET of FIG. 1.

However, FIG. 3 illustrates simulated degradation performances and corresponding fitting points of the short channel pMOSFET of FIG. 1, and the current from the source terminal 110 to the drain terminal 130 does not increase first then decrease. The horizontal axis of FIG. 3 is related to the stress time, and the vertical axis is related to the current degradation, which is presented by percentage but not by the current changing ratio.

In this embodiment, the three simulation results in FIG. 3 are performed by the Berkeley Short-channel IGFET Model 4 (BSIM4) model with MOS modeling and reliability analysis solution (MOSRA) consideration but not limited to the present disclosure.

The BSIM4 is one of the Berkeley Short-channel IGFET Models (BSIMs), which refer to a family of MOSFET transistor models for integrated circuit design. In some embodiments, the BSIM4 simulation can be performed by programs including Simulation Program with Integrated Circuit Emphasis (SPICE) program.

The MOSRA is a simulation flow used to simulate MOSFET device aging, which is caused by, for example, hot carrier injection (HCI) and bias temperature instability (BTI). The MOSRA can be a post-process program for the BSIM4 simulation. However, the unexpected electrical properties for short channel pMOSFET cannot be performed since it does not take into account the HEIP effect for the MOSRA. In some embodiments, the MOSRA includes MOSRA level1 and MOSRA level3. The MOSRA level1 is a physics-based process, and the MOSRA level3 is an empirical model. The MOSRA has modeling parameters respectively associated with temperatures, driving voltages, channel length of a simulated pMOSFET for both MOSRA level1 and MOSRA level3.

As shown in FIG. 3, data points of three different fitting curve C1, C2 and C3 are transformed by three groups of simulated data points, and all of the simulated data points illustrate that the current from the source terminal 110 to the drain terminal 130 decreases over the stress time, and the simulation results of FIG. 3 are different from the measured degradation in FIG. 2. Thus, the HEIP phenomenon is considered at the BSIM4 model with the MOSRA consideration, which is a conventional simulation model.

In order to improve the simulated result, in the present disclosure, a method 200 for establishing an aging model is provided.

Figure 4:
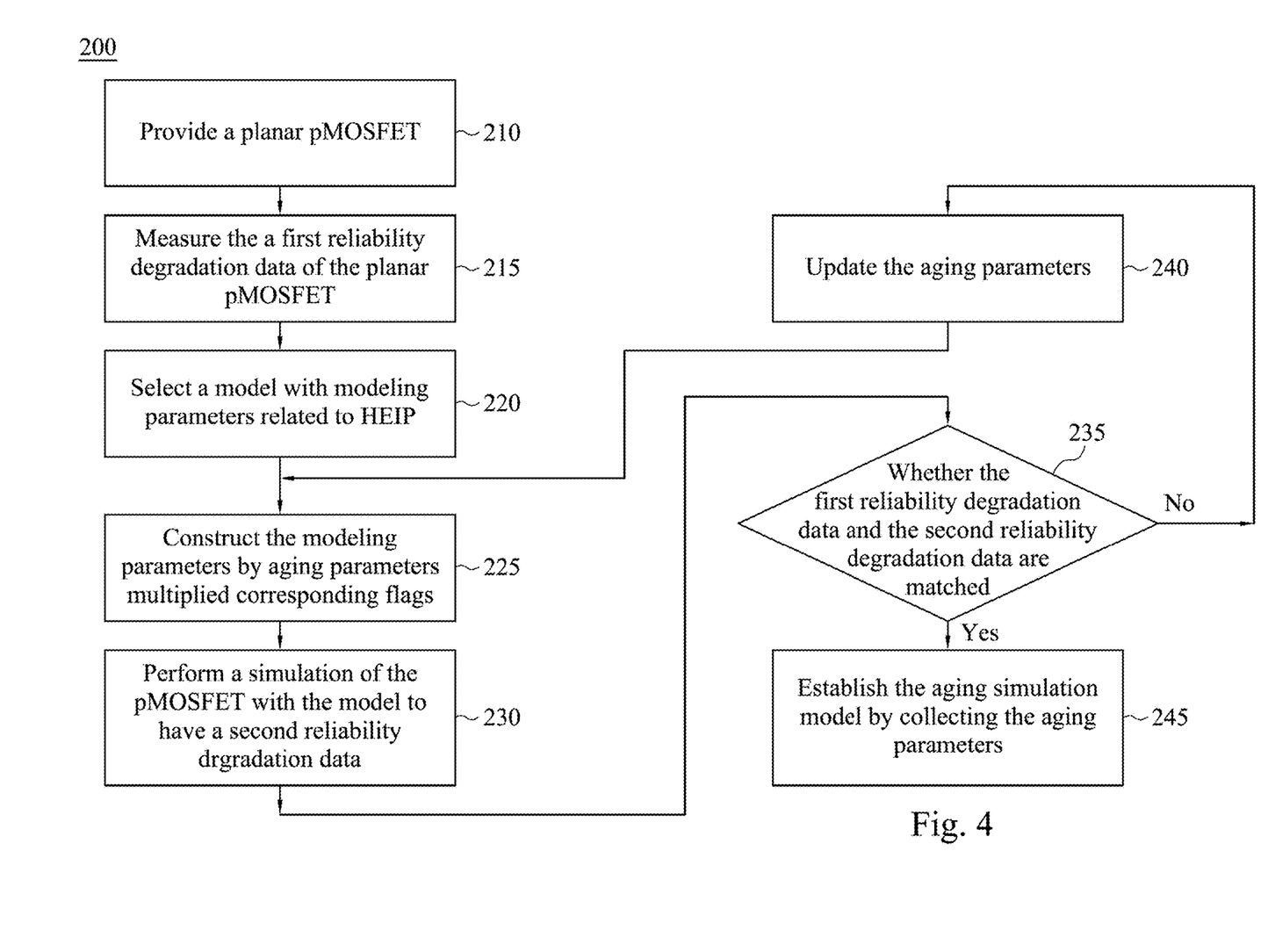
FIG. 4 is a flow chart of a method for establishing an aging model according one embodiment of the present disclosure.

FIG. 4 is a flow chart of a method 200 for establishing an aging model according one embodiment of the present disclosure.

In operation 210, a planar pMOSFET 100 shown as FIG. 1 is provided. In this embodiment, the pMOSFET 100 has a channel length Leff less than 100 nm, and the pMOSFET 100 is surrounded by the shallow trench isolation 140 with a liner nitride.

In operation 215, the pMOSFET 100 is measured to have a first reliability degradation data. Specifically, in this embodiment, a voltage between the source terminal 110 and the drain terminal 130 is greater than a voltage between the source terminal and a gate terminal 120 of the pMOSFET 100, and horizontal electric field from the source terminal 110 to the drain terminal 130 is greater than the vertical electrical field from the gate terminal 120 to the source terminal 110. The first reliability degradation data is the relation about the current changing over time. Thus, the current from the source terminal 110 to the drain terminal 130 is measured to have the first reliability degradation data.

After measuring, the first reliability degradation is provided as shown in FIG. 2.

Continued with operation 215, in operation 220, a simulation model for pMOSFET 100 is selected, and the simulation result is related to the modeling parameters of the simulation model. In this embodiment, the selected simulation model is BSIM4 model with MOSRA consideration (e.g. MOSRA level 1 or MOSRA level 3). The modeling parameters are the input parameters used for the selected simulation model.

Some of the modeling parameters are related to the hot carrier induced punch-through (HEIP) physically. For example, in this embodiment, the modeling parameters of the selected simulation model includes six hot carrier injection (HCI) parameters HCIN, HCID, HCIG, HCIEA, HCIM and HCIAP but not limited to the present disclosure. In general, the HCI parameters for aging simulation of a pMOSFET are used to the current fixing in the MORSA.

Specifically, in this embodiment, the HCI parameters HCIN is associated with the stress time, the HCI parameters HCID is associated with the current trend, the HCI parameters HCIG is associated with the voltage of the gate terminal 130, the HCI parameters HCIEA is associated with the thermal energy (e.g. the temperature of the pMOSFET 100), the HCI parameters HCIM is associated with the effective channel length of the pMOSFET 100, and the HCI parameters HCIAP is related to the total magnitude of current.

Proceed to operation 225. The six HCI parameters HCIN, HCID, HCIG, HCIEA, HCIM and HCIAP consist of aging parameters multiplied corresponding flags.

Specifically, the input HCI parameters can be formed as following:

$$HCIN=N1*flg1+N2*flg2+N3*flg3+N4*flg4$$

$$HCID=D1*flg1+D2*flg2+D3*flg3+D4*flg4$$

$$HCIG=G1*flg1+G2*flg2+G3*flg3+G4*flg4$$

$$HCIEA=EA1*flg1+EA2*flg2+EA3*flg3+EA4*flg4$$

$$HCIM=M1*flg1+M2*flg2+M3*flg3+M4*flg4$$

$$HCIAP=AP1*flg1+AP2*flg2+AP3*flg3+AP4*flg4$$

As shown above, aging parameters include N1, N2, N3, N3, D1, D2, D3, D4, G1, G2, G3, G4, G4, EA1, EA2, EA3, EA4, M1, M2, M3, M4, AP1, AP2, AP3 and AP4, and the flags include flg1, flg2, flg3 and flg4. Although the six HCI parameters HCIN, HCID, HCIG, HCIEA, HCIM and HCIAP are modeling parameters in the convention BSIM4 model with MOSRA consideration, the simulation result can be controlled by the aging parameters.

Each flag is related to a condition about the pMOSFET 100 operates with the HEIP phenomenon. In this embodiment, the flags flg1, flg2, flg3 and flg4 are numbers "0" or "1" used to perform on/off functions logically.

For example, the flag flg1 is "1" meaning "ON" when the channel length Leff is less than a selected length L1, otherwise the flag flg1 is "0" meaning "OFF". In this embodiment, the selected length L1 is 100 nm.

Similarly, in this embodiment, the flag flg2 is "1" when the voltage between the gate terminal 120 and the source terminal 110 is less than a specific voltage V1 and the voltage between the drain terminal 130 and the source terminal is greater than a specific voltage V2, otherwise the flag flg2 is "0".

Opposite to the flag flg1, in this embodiment, the flag flg3 is "1" when the channel length Leff is greater than the selected length L1, otherwise the flag flg3 is "0". Similarly, the flag flg4 is "1" when the voltage between the gate terminal 120 and the source terminal 110 is greater than or equal to the specific voltage V1 and the voltage between the drain terminal 130 and the source terminal is less than or equal to the specific voltage V2.

Through the setting of the flags flg1 and flg2, when the simulated pMOSFET is a short channel pMOSFET and operates under the HEIP phenomenon, the HEIP phenomenon can be further considered in the simulation model through a group of aging parameters N1, N2, D1, D2 etc. If not, the flags flg1 and flg2 are "0", and the flags flg3 and flg4 are used to include another group of aging parameters N3, N4, D3, D4 etc.

The number of the aging parameters that form the HCI parameter depends on the number of flags. In some embodiments, the number of flags is two, and each modeling parameter consists of two aging parameters multiplied corresponding two flags.

After selecting simulation model and constructing modeling parameters by the aging parameters multiplied corresponding flags, proceed to operation 230. In operation 230, a simulation of the pMOSFET 100 is performed, and each modeling parameter consists of a part of the aging parameters multiplied corresponding flags are used to control the aging mechanism in the simulation. When the simulation is completed, a second reliability degradation data, which is also a relation about the current from the source terminal 110 to the drain terminal 130, is provided.

Continued with operation 230, in operation 235, compare the first reliability degradation data with the second reliability degradation data. It should be understood that whether the first reliability degradation data and the second reliability degradation data are matched. The first reliability degradation data and the second reliability degradation data are two curves about the current changing over time. It can be calculated that the difference between the first reliability degradation data and the second reliability degradation data for each time, and the summation of the difference between the first and second reliability degradation data for each time can be used as a matching condition in some embodiment.

In some embodiment, if the first reliability degradation data and the second reliability degradation data are not matched, i.e., the total difference the first reliability degradation data and the second reliability degradation data for each time is not less than a determined value, proceed to operation 240.

In operation 240, the aging parameters are updated, and a new simulation of the pMOSFET 100 can be performed through the operations 225 and 230. Therefore, proceed to operation 235, compare the first reliability degradation data with the new second reliability degradation data. The operation 235 is repeated until the first reliability degradation data and the second reliability degradation data are matched.

Since the first reliability degradation data and the second reliability degradation data are matched, it illustrates that the aging parameters can perform the HEIP phenomenon in the simulation. Therefore, in operation 245, an aging simulation model can be established by collecting the aging parameters. That is, for a specific condition that the HEIP appears, the HCI modeling parameters of the conventional simulation model can be directly replaced by the collected aging parameters.

Specifically, when integrated circuits including a short channel pMOSFET are required to be simulated, the modeling parameters for the short channel pMOSFET can be replaced by the collected aging parameters multiplied corresponding flags, and the HEIP aging phenomenon can be performed in the short channel of the integrated circuits.

In some embodiments, the collected aging parameters can be functions related to the temperature of the pMOSFET, channel length Leff, driving voltage of the source terminal 110, gate terminal 120 and drain terminal 130 and the stress time.

Figure 5:
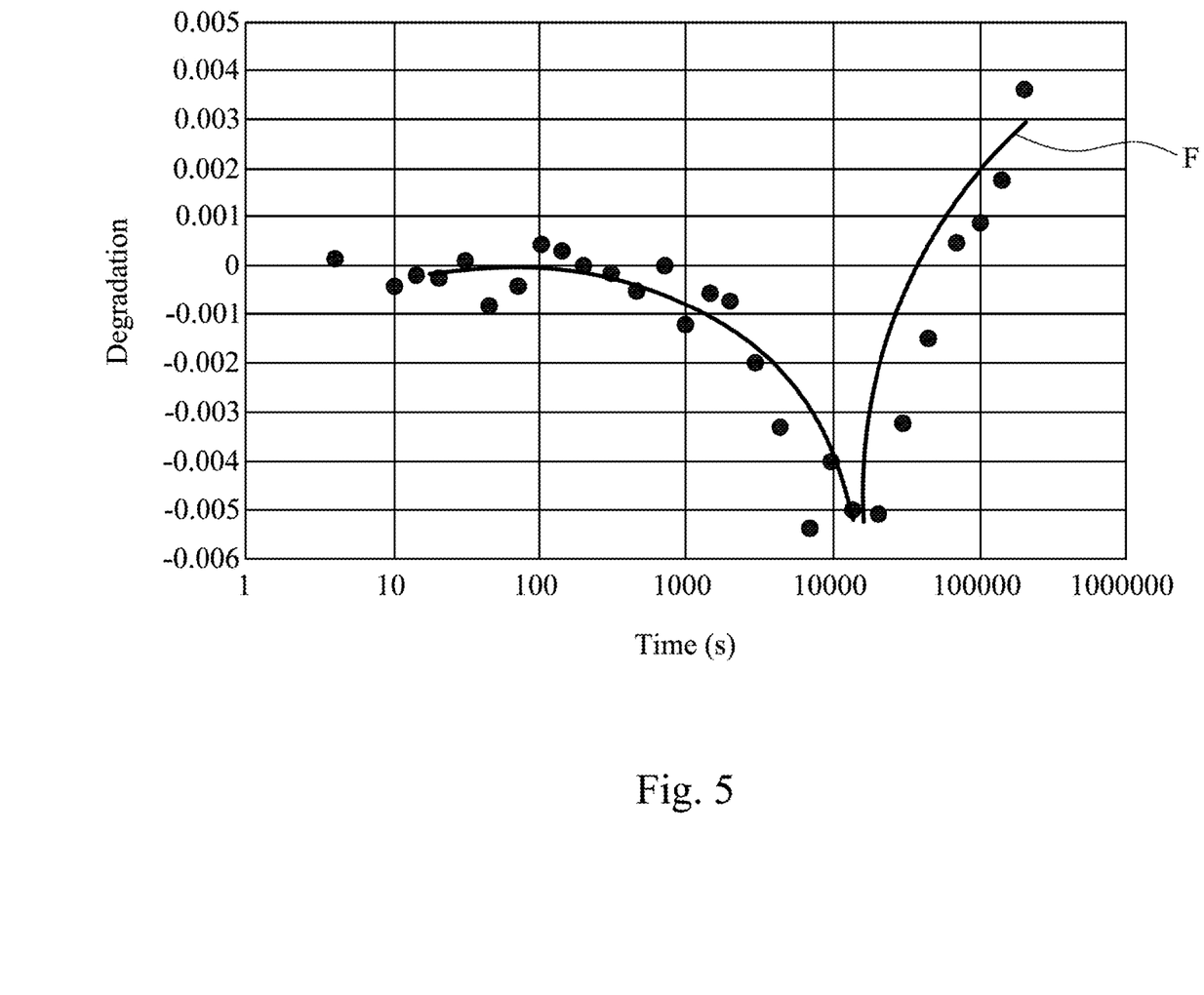
FIG. 5 illustrates degradation performance measured by the short channel pMOSFET of FIG. 1 and a corresponding simulated curve made by the method of FIG. 4.

FIG. 5 illustrates example degradation performance measured by the short channel pMOSFET of FIG. 1 and a corresponding simulated curve D made by the method 200 of FIG. 4. As shown in FIG. 5, the curve F presents that the current changing caused by the HEIP phenomenon increases first than decreases, the curve F and the measured data points are quite matched.

Figure 6:
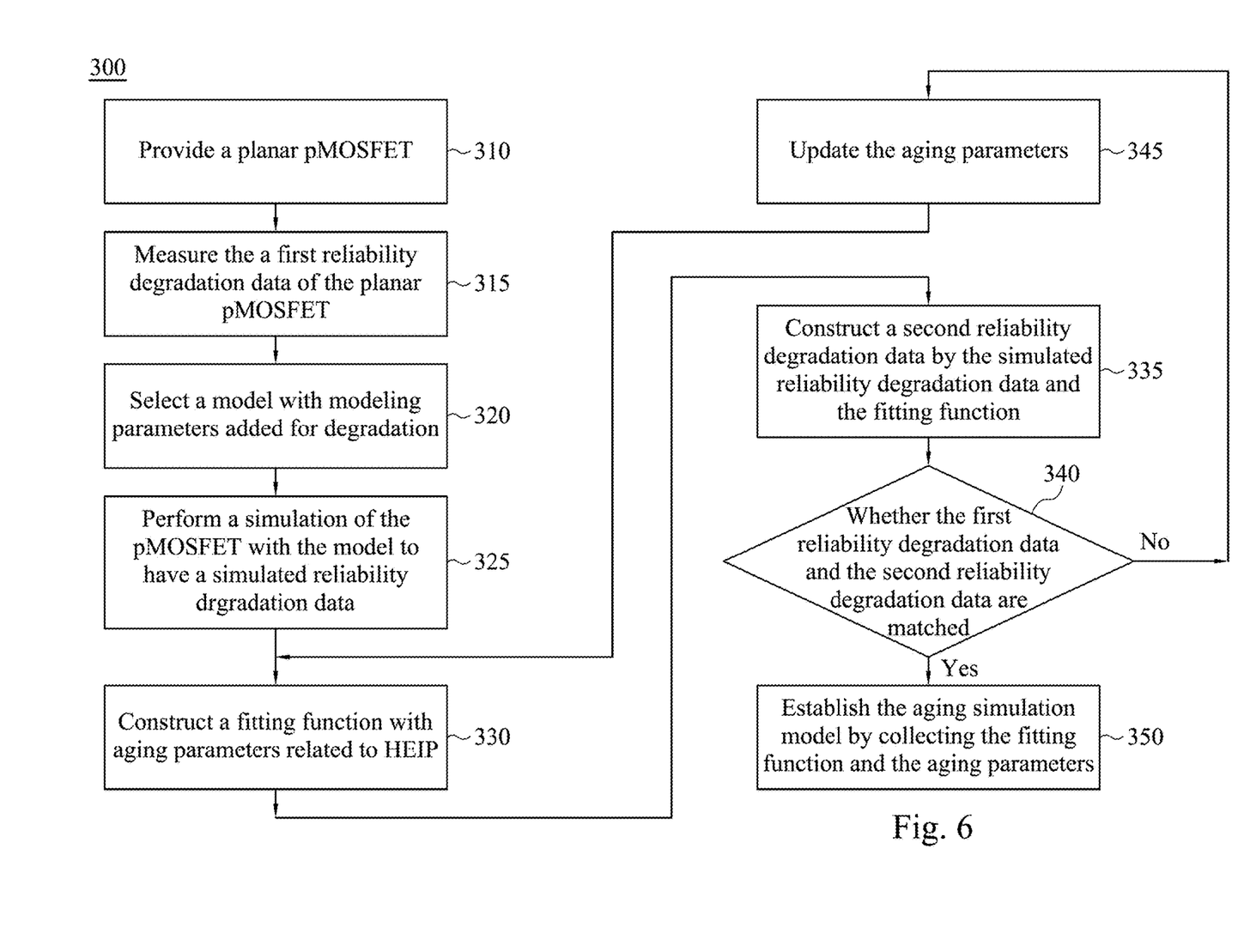
FIG. 6 is a flow chart of another method for establishing an aging model according to one embodiment of the present disclosure.

FIG. 6 is a flow chart of another method 300 for establishing an aging model according to one embodiment of the present disclosure.

The difference between the method 300 in FIG. 6 and the method 200 in FIG. 4 is that the HEIP phenomenon in the pMOSFET 100 is provided by the additional fitting function but not by fixing the modeling parameters in the conventional simulation model.

Similar to method 200, operation 310 of method 300 is that providing a short channel planar pMOSFET used to be measured, and the operation 315 is that measuring a first reliability degradation data of the pMOSFET 100 used to be compared.

In some embodiments, the first reliability degradation data is the relation about the current changing over time. Thus, the current from the source terminal 110 to the drain terminal 130 is measured to have the first reliability degradation data.

Proceed to operation 320, a simulation model with modeling parameters added for degradation is selected for the pMOSFET 100. In some embodiments, the simulation model is BSIM4 model.

Continued with operation 325, a simulation of the pMOSFET with the selected simulation model is performed to have a simulated reliability degradation data. In general, the simulated reliability degradation data and the first simulated reliability degradation data are not matched, and an additional function is required to fix the simulated reliability degradation data. In some embodiments, it can further set up the degradation periods for the simulation, and it can be used to fitting the first reliability degradation data period by period.

In operation 330, a fitting function is constructed with aging parameters, which is related to the HEIP phenomenon. The fitting function is used to fix the degradation trend of the simulated reliability degradation data. The fitting function is with aging parameters related to the HEIP phenomenon.

Specifically, in some embodiments, the simulated reliability degradation data is a relation about the current from the source terminal 110 to the drain terminal 130 over time, and the current changing function I(t) is a relation, which is about current over time, showing the difference between the first reliability degradation data and the simulated reliability degradation data.

In some embodiment, the fitting function is a current changing function I(t), which is a function over time t, shown as follow:

$$I(t) = A_p e^{G \times type \times V_{GS}} \times e^{-(Ea)/(kT)} \times t^n \times e^{D \times |V_{DS}|} \times e^{-m \times Leff} \times (\text{switch})$$

In the current changing function I(t), aging parameters are included. The aging parameters include aging parameters $A_p$, G, Ea, n, and D.

The term "switch" is used to turn on or turn off the effect of the current changing function I(t). The term "switch" is a number, which is "1" or "0". If the HEIP phenomenon is not performed on the simulated device, the term "switch" can be configured as "0", and the current changing function I(t) can be vanished.

The term "type" is a number related to the type of the MOSFET. The term "$V_{GS}$" is the voltage between the gate terminal 120 and the source terminal 110. The term "kT" is the thermal energy of the pMOSFET, and thermal energy is the Boltzmann constant "k" multiplied the temperature "T". The term "t" is the stress time. The term "$V_{DS}$" is the voltage between the source terminal 110 and the drain terminal 130. The term "Leff" is the channel length of the pMOSFET 100, and the channel length Leff is less than 100 nm in this embodiment.

Similarly, the aging parameter $A_p$ is related to the total magnitude of current changing, the aging parameter G is associated with the voltage of the gate terminal 130, the aging parameter Ea is associated with the thermal energy "kT", the aging parameter n is associated with the stress time "t", and the aging parameter D is associated with the voltage between the source terminal 110 and the drain terminal 130. Through the aging parameters $A_p$, G, Ea and D, the current changing function I(t) can be controlled.

By adjusting the aging parameters, the current changing function I(t) can be controlled to fix the first reliability degradation data.

After constructing the current changing function I(t) used as the fitting function, proceed to operation 335 to construct a second reliability degradation data by the simulated reliability degradation data and the current changing function I(t).

In this embodiment, the simulated reliability degradation data is the current changing ratio with respect to the initial current measured by the pMOSFET 100 in operation 315. A degradation changing function is formed by dividing the current changing function I(t) by the initial current measured in operation 315, and the second reliability degradation data is directly the simulated reliability degradation data plus the degradation changing function formed by current changing function I(t).

In other words, the aging parameters are used to fix a simulated current relation between the source terminal and the drain terminal of the pMOSFET 100 through the current changing function I(t).

Continued with operation 335, in operation 340, compare the first reliability degradation data with the second reliability degradation data. It should be understood that whether the first reliability degradation data and the second reliability degradation data are matched. The first reliability degradation data and the second reliability degradation data are two curves about the current changing over time. It can be calculated that the difference between the first reliability degradation data and the second reliability degradation data for each time.

If the first reliability degradation data and the second reliability degradation data are not matched, i.e., the total difference between the first reliability degradation data and the second reliability degradation data for each time is not less than a determined value, proceed to operation 345.

In operation 345, the aging parameters are updated, and the current changing function I(t) used as the fitting function is modified yet a new simulation of the pMOSFET 100 is not required. Subsequently, proceed to operations 330, 335 and 340 to re-construct the second reliability degradation data and compare the first reliability degradation data with the new second reliability degradation data. The operation 340 is repeated until the first reliability degradation data and the second reliability degradation data are matched enough.

Since the first reliability degradation data and the second reliability degradation data are matched, it illustrates that the aging parameters can perform the HEIP phenomenon in the simulation. Therefore, in operation 350, an aging simulation model can be established by collecting the fitting function and the aging parameters. That is, for a specific condition that the HEIP appears, an additional current changing function I(t) with aging parameters can be included to fix the simulated result according to the conventional simulation model.

Specifically, when integrated circuits including a short channel pMOSFET are required to be simulated, the current from the source terminal to the drain terminal for the short channel pMOSFET can be performed by the simulated current and an addition fitting function with aging parameters (e.g. the current changing function I(t)).

In summary, two methods for establish aging simulation models are provided, and the HEIP phenomenon is included in the two method in two different way. In one of the two methods, aging parameters with corresponding flags are included in the modeling parameters under the conventional simulation tool. In another method, the HEIP phenomenon is included through an addition fitting function. Since the HEIP phenomenon can be considered in the present disclosure, it can have more accuracy semiconductor behavior than conventional simulation model.

Although the embodiments of the present disclosure have been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the embodiments of the present disclosure without departing from the scope or spirit of the present disclosure. In view of the foregoing, it is intended that the present disclosure cover modifications and variations of the present disclosure provided they fall within the scope of the following claims.

What is claimed is:

1. A method for aging simulation model establishment in semiconductor integrated circuit, comprising:
   providing a planar p-type metal-oxide-semiconductor field-effect transistor (pMOSFET) having a source and a drain;
   measuring a current from the source to the drain of the pMOSFET to serve as a first reliability degradation data of the pMOSFET;
   selecting a model for the pMOSFET with modeling parameters related to hot carrier induced punchthrough (HEIP), wherein the modeling parameters comprise hot carrier injection (HCI) parameters used to fix a simulated current relation between the source and the drain, the HCI parameters comprise adjustable numbers to be inputted;

constructing the modeling parameters by multiplying aging parameters by corresponding flags, wherein each adjustable number of the HCI parameters is a summation of the aging parameters multiplied by the corresponding flags;

performing a simulation of the pMOSFET with the model by the modeling parameters to have a second reliability degradation data;

updating the aging parameters and re-performing the simulation if the first reliability degradation data and second reliability degradation data are not matched;

collecting the aging parameters when the first reliability degradation data and the second reliability degradation data are matched to establish an aging simulation model for the pMOSFET; and performing a HEIP aging phenomenon in a short channel pMOSFET of an integrated circuit, wherein when a simulation of the integrated circuit with the short channel pMOSFET is performed, HCI modeling parameters of the short channel pMOSFET are replaced by the flags multiplied by the corresponding aging parameters collected by the aging simulation model to obtain a simulated current of the integrated circuit with the HEIP aging phenomenon.

2. The method of claim 1, wherein the pMOSFET has an effective channel length less than 100 nm.

3. The method of claim 1, further comprising:
surrounding the pMOSFET by a shallow trench isolation with a liner nitride.

4. The method of claim 1,
wherein a voltage between the source and the drain is greater than a voltage between the source and a gate of the pMOSFET.

5. The method of claim 1, wherein the selected model comprises a MOS modeling and reliability analysis solution (MOSRA) model.

6. The method of claim 1, wherein the HCI parameters are respectively associated with a temperature, driving voltages, and an effective channel length of the pMOSFET.

7. The method of claim 1, wherein each flag is one or zero, and the flags are configured to perform on/off functions logically.

8. A method for aging simulation model establishment in semiconductor integrated circuit, comprising:
providing a planar p-type metal-oxide-semiconductor field-effect transistor (pMOSFET) having a source and a drain;
measuring a current from the source to the drain of the pMOSFET to serve as a first reliability degradation data of the pMOSFET;

selecting a model for the pMOSFET with modeling parameters added for degradation;

performing a simulation of the pMOSFET with the model to have a simulated reliability degradation data;

constructing a fitting function with aging parameters related to hot carrier induced punch-through (HEIP), wherein the aging parameters is used to fix a simulated current relation between the source and the drain;

constructing a second reliability degradation data by the simulated reliability degradation data and the fitting function;

updating the aging parameters and re-calculating the fitting function to have an improved second reliability degradation data if the first reliability degradation data and second reliability degradation data are not matched;

collecting the fitting function and the aging parameters when the first reliability degradation data and the second reliability degradation data are matched to establish an aging simulation model for the pMOSFET; and performing a current from a source terminal to a drain terminal for a short channel pMOSFET of an integrated circuit, wherein when the simulation of the integrated circuit with the short channel pMOSFET is performed, the fitting function with the aging parameters collected by the aging simulation model is added to a current relation between the source and the drain of the short channel pMOSFET in a simulation result of the integrated circuit to obtain a simulated current of the integrated circuit with HEIP aging phenomenon.

9. The method of claim 8, wherein the pMOSFET has an effective channel length less than 100 nm.

10. The method of claim 8, further comprising:
surrounding the pMOSFET by a shallow trench isolation with a liner nitride.

11. The method of claim 8, wherein a voltage between the source and the drain is greater than a voltage between the source and a gate of the pMOSFET.

12. The method of claim 8, wherein the selected model comprises a berkeley short-channel IGFET model 4 (BSIM4) model.

13. The method of claim 12, wherein the performing the simulation of the pMOSFET with the model to have the simulated reliability degradation data further comprises:
setting up degradation periods for the simulation.

14. The method of claim 8, wherein the aging parameters are respectively associated with a temperature, driving voltages, and an effective channel length of the pMOSFET.

* * * * *